(No Model.)

A. KEIL.
CAR WHEEL AND AXLE.

No. 290,435. Patented Dec. 18, 1883.

WITNESSES
Wm A. Skinkle
Alfred C. Newman.

INVENTOR
Adam Keil.
By his Attorneys
Baldwin, Hopkins, & Peyton

UNITED STATES PATENT OFFICE.

ADAM KEIL, OF MONONGAHELA CITY, PENNSYLVANIA.

CAR WHEEL AND AXLE.

SPECIFICATION forming part of Letters Patent No. 290,435, dated December 18, 1883.

Application filed October 1, 1883. (No model.)

*To all whom it may concern:*

Be it known that I, ADAM KEIL, of Monongahela City, in the county of Washington and State of Pennsylvania, have invented certain new and useful Improvements in Car Wheels and Axles, of which the following is a specification, reference being had to the accompanying drawings.

My improvements relate especially to pit-car wheels and axles, by which I mean those cars or wagons which are employed for delivering coal from a mine under ground to some point of delivery above ground; but they are also applicable to other vehicles.

The object of my improvement is to provide a cheap and suitable construction by which the car-axle, upon which the wheel rotates freely, may be conveniently lubricated without unnecessary labor or waste of oil, while at the same time I protect the journal from water, coal-dust, dirt, grit, or other foreign matter likely to generate friction and cause undue wear, and also provide for slight longitudinal motion of the wheel upon the axle.

Figure 1:
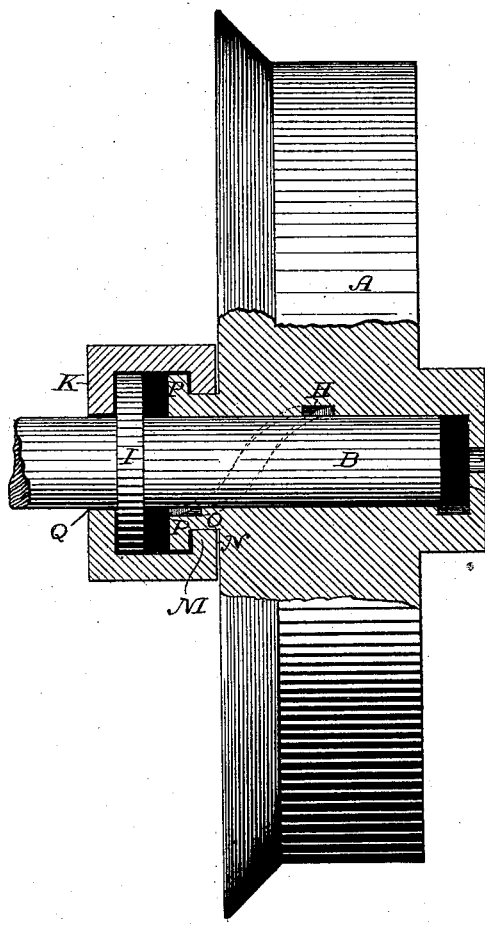
Figure 2:
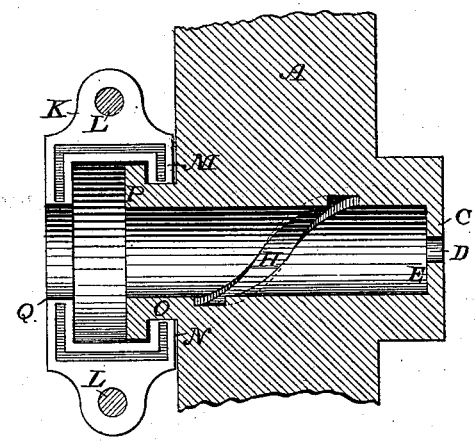
Figure 3:
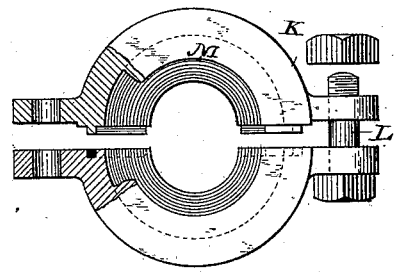

In the drawings, Figure 1 represents an edge view of a car-wheel partly broken away to show the axle-journal, and the housings are illustrated in section. Fig. 2 represents a section of a car-wheel broken away, showing the housings in section at right angles to Fig. 1. Fig. 3 is an elevation of the two half-sections of the inside housing, partly in section and slightly separated from each other.

A indicates the car-wheel and B the axle.

On the outside of the car-wheel and covering the outer end of the axle there is cast or properly secured, by means of bolts or the like, a cap, C, through the center of which is a small opening, D, to admit oil from the spout of an oil-can. This cap does not fit snugly against the end of the axle, but leaves an oil space or cup, E.

H indicates a spiral groove in the bearing of the wheel, the object of which is to distribute the oil as it enters around the axle at its outer end along the surface of the journal.

I indicates a fixed collar upon the journal on the inner side of the wheel.

K indicates an oil-box, made in sections, as illustrated in Fig. 4, which are joined oil-tight by means of bolts L, or in any other suitable manner. This oil-box is provided with an annular flange, M, which projects inwardly and enters an annular recess, N, in the hub O, which hub has an annular ring, P, extending to or nearly to the wall of the oil-box. From this construction it will be observed that as the oil is poured into the oil-opening D it will fill the oil-cup E partly full, and the oil will tend to flow inward along the journal of the car-axle, and cannot drip on the outside of the wheel, because the cap C closes it in effectually. As soon as the axle is turned—for example, in the direction for taking a load out of a mine — on account of the direction of turn of the spiral groove H, the oil will be spread well over the entire surface of the journal of the axle from the interior of the oil-box on the inside surface of the wheel, where ordinary waste or oil packing for lubricating purposes may be employed, if desired. When the wheel is turned in the opposite direction—as for going into a mine empty—the spiral groove will tend to distribute it in the opposite direction, and will keep the journal sufficiently lubricated for use when a load is not being drawn.

The oil-box may be provided with any suitable annular packing between the flange M and the ring P on the hub, to prevent the escape of oil, and any suitable annular packing may be used at the point Q between the edge of the box and the axle, whereby the joints will be made perfectly tight, so that no oil can escape and no dust or other impurities can enter. Any suitable cap or stopper may be employed to close the opening D. With this construction linchpins may be dispensed with, because the fixed collar I will, without linchpins, serve to hold the wheel upon the axle, while it also serves to distribute the oil in the oil-box and keep it in motion. The space or oil-cup E will admit of longitudinal movement of the wheel upon the axle.

With my improved structure and connection of the wheel and axle one oiling will serve in practice for a period of several weeks, thus dispensing with the labor and difficulty of daily oiling, as is now commonly found necessary; hence my improvements are of material utility and advantage.

Having thus described my invention, what

I claim as new, and desire to secure by Letters Patent of the United States, is—

1. The combination, with a car-wheel loose upon its axle, of a hub, O, provided with an annular recess, N, and a ring, P, a fixed collar, I, upon the axle, and an oil-box, K, made in sections, and provided with a flange, M, and so arranged that the wheel may have longitudinal play upon the axle, substantially as set forth.

2. The combination, with the wheel loose upon the axle, of the cap C, provided with a central oil-opening, D, the oil-cup E, permitting longitudinal movement of the wheel upon the axle, the spiral groove H, and the oil-box K and hub O, constructed and arranged substantially as set forth.

In testimony whereof I have hereunto subscribed my name this 24th day of September, A. D. 1883.

ADAM KEIL.

Witnesses:
MARCUS S. HOPKINS,
J. SUTTON WALL.